United States Patent [19]

Ohta et al.

[11] 4,130,159
[45] Dec. 19, 1978

[54] HEAT EXCHANGER

[75] Inventors: Kazuhiro Ohta, Nagoya; Mituzi Ohshima, Ohbu, both of Japan

[73] Assignee: Nippondenso Co., Ltd., Kariya, Japan

[21] Appl. No.: 580,757

[22] Filed: May 27, 1975

[30] Foreign Application Priority Data

May 28, 1974 [JP] Japan ............................ 49/60970[U]

[51] Int. Cl.² .................................................. F28F 9/00
[52] U.S. Cl. ................................ 165/111; 123/41.54; 165/107 D
[58] Field of Search ................. 165/110, 111, 107 D, 165/51; 123/41.54

[56] References Cited

U.S. PATENT DOCUMENTS

| 2,343,145 | 2/1944 | Heiney | 165/111 X |
| 3,254,707 | 6/1966 | Ferguson | 165/DIG. 22 |
| 3,499,481 | 3/1970 | Aurea | 123/41.54 |
| 3,583,478 | 6/1971 | Fieni | 165/175 X |
| 4,006,775 | 2/1977 | Aurea | 165/107 |

FOREIGN PATENT DOCUMENTS 1264130  2/1972  United Kingdom ................. 123/41.54

Primary Examiner—Albert W. Davis, Jr.
Attorney, Agent, or Firm—Cushman, Darby & Cushman

[57] ABSTRACT

An upper tank of a heat exchanger for an automotive vehicle is divided into an upper room and a lower room by a partition wall, on which a positive pressure valve and a negative pressure valve are provided for respectively forming a passageway from the lower room to the upper room when the pressure in the lower room exceeds a predetermined value and a passageway from the upper room to the lower room when the pressure in the lower room becomes lower than a predetermined value, whereby the upper room serves as a reserve tank.

6 Claims, 6 Drawing Figures

HEAT EXCHANGER

BACKGROUND OF THE INVENTION

(1) Field of the Invention

The present invention relates to an improvement of a heat exchanger such as a radiator used in an automotive vehicle, and more particularly to a radiator having an upper tank integrally formed with a reserve tank, which is made of resin.

(2) Description of Prior Art

In a conventional heat exchanger used as a radiator for an automotive vehicle, a so-called reserve tank is generally provided to a radiator, however, being separated therefrom, in order to ensure a space for cooling fluid expanded by heat transfer in the radiator.

However, the conventional radiator is high in cost because of provision of the separated reserve tank and requires a considerably large space for such a tank in an engine room, which has become disadvantageous today since much equipment is required to be mounted therein for the emission control.

SUMMARY OF THE INVENTION

It is, therefore, a primary object of the present invention to provide a heat exchanger which is low in cost.

It is another object of the present invention to provide a heat exchanger which does not require a large space in an engine room.

It is a further object of the present invention to provide a heat exchanger whose upper tank is divided into two parts by a partition wall on which pressure valve means is provided, whereby the upper room or compartment above the partition wall serves as a reserve tank.

Other objects and features of the present invention become more apparent in connection with drawings.

DESCRIPTION OF THE PREFERRED EMBODIMENTS

Figures 1, 2:
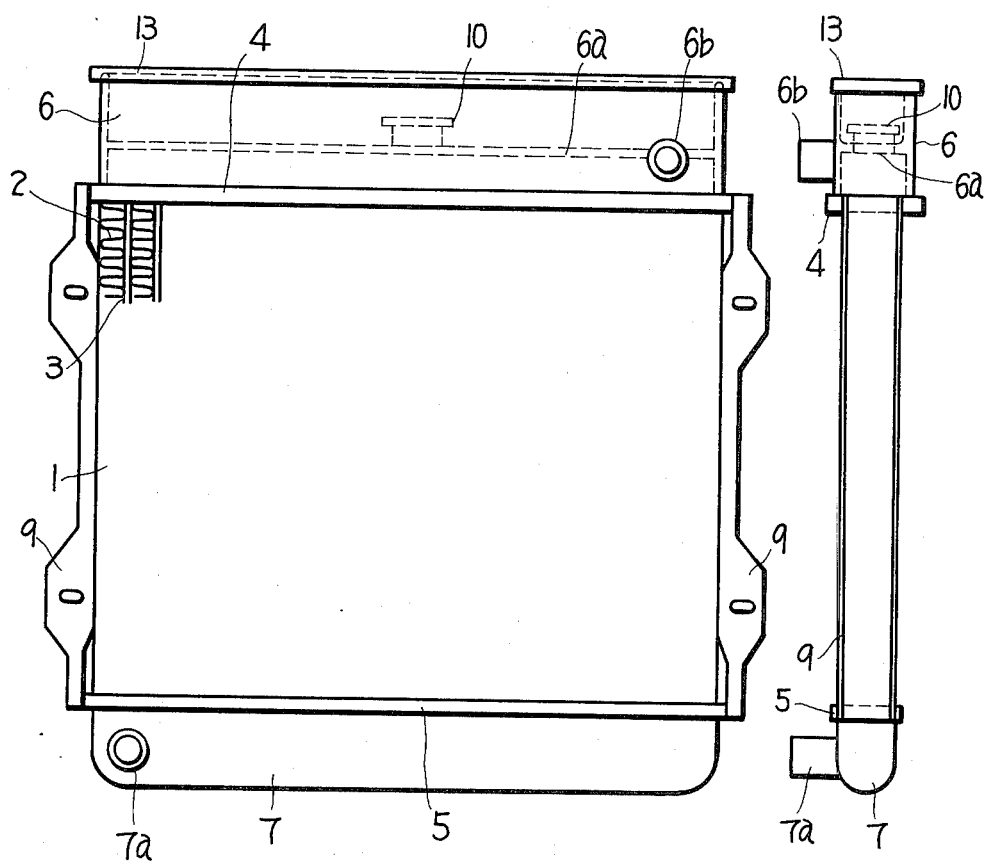
FIG. 1 is an elevational view of a heat exchanger according to the present invention.
FIG. 2 is a side view of the heat exchanger shown in FIG. 1.
Figure 3:
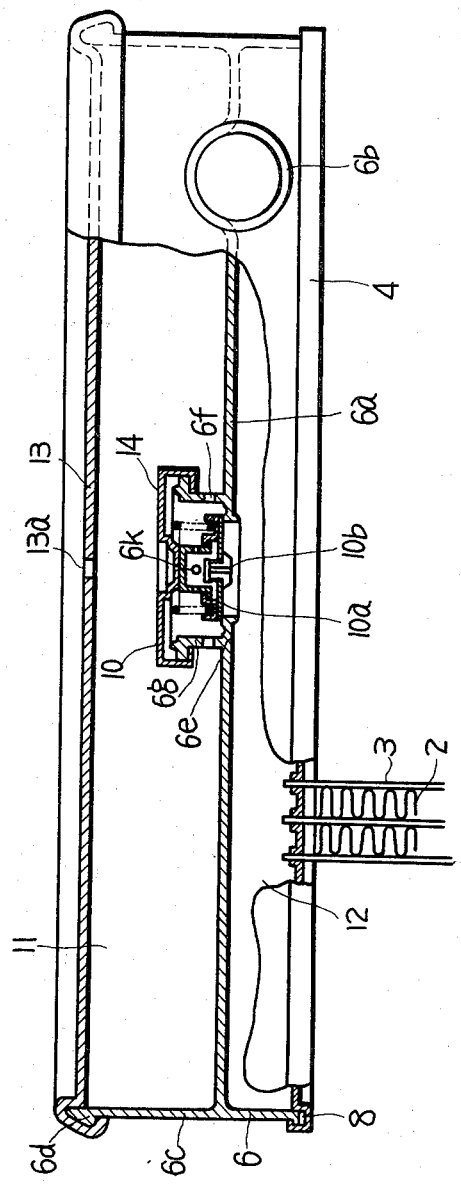
FIG. 3 is an expanded fragmentary sectional view partially diagrammatic for illustrating an upper tank in detail.

Referring now to FIGS. 1, 2 and 3 showing a first embodiment of the present invention, a radiator core 1 for constituting a heat transfer portion between cooling fluid and air comprises cooling fins 2 and water conduits 3 made of a metallic material having a high thermal conductivity such as brass, aluminum or the like. Core plates or end plates 4 and 5 made of brass, aluminum or the like and for holding both ends of the water conduits 3 are fixed thereto by soldering or the like.

An upper tank 6 is made of a resin and is integrally formed with a partition wall 6a and an inlet pipe 6b. A lower tank 7 is made of a resin and is integrally formed with an outlet pipe 7a. The resin forming the upper and lower tanks 6 and 7 and partition 6a is preferably a thermoplastic resin reinforced by a glass fiber, such as premix, polypropylene, nylon or the like.

The core plates 4 and 5 are respectively fitted to the upper and lower tank 6 and 7 by caulking with elastic shield elements 8 such as rubber (shown in FIG. 3) interposed therebetween.

Brackets 9 made of an iron are fixed to the core plates 4 and 5 by soldering. Valve means 10 provided on the partition wall 6a comprises a pressure relief cap 14, a positive pressure valve 10a and a negative pressure valve 10b constructed in a conventional manner.

The upper tank 6 is divided into an upper room or compartment 11 and a lower room or compartment 12 by the partition wall 6a and is provided with a claw 6d at an upper end of an outer wall 6c thereof.

A cover plate 13 made of a resin is fitted to the tank 6 by clippingly engaging the claw 6d to permit easy removal therefrom, and is provided with a through hole 13a for communicating the upper room 11 with the surrounding atmosphere. A base 6e and filler tube 6g for mounting the valve means 10 are integrally formed on the partition wall 6a.

Apertures 6f are provided on the filler tube 6g for permitting the cooling fluid to flow therethrough.

Apertures 6k are also provided on a cylindrical portion of the positive pressure valve 10a to form a passageway for the cooling fluid to flow from the upper room 11 to the lower room 12.

The construction and function of the valve means 10 is well known as described in the British Pat. No. 957,130.

An operation of the heat exchanger as constructed above will be explained. The cooling fluid such as water is supplied to the heat exchanger, especially to the lower room 12 of the upper tank 6 by taking off the pressure-relief cap 14 until the lower room 12 is at least fully filled with the cooling fluid, and thereafter the pressure-relief cap 14 is engaged with the filler tube 6g again.

When an associated engine is operated, the temperature of the cooling fluid is increased (not shown) and the fluid expands. With the measuring increase of the pressure of the cooling fluid in the lower room 12, the cooling fluid is permitted to flow from the lower room 12 to the upper room 11 through the positive pressure valve 10a and the apertures 6f.

Thereafter, when the engine is stopped, the temperature decreases with the decrease of the pressure of the cooling fluid in the lower room 12. As a result, the cooling fluid is permitted to flow from the upper room 11 to the lower room 12 through the apertures 6f, the apertures 6k and the negative pressure valve 10b.

Accordingly, the upper room or compartment 11 serves as a reserve tank.

Figure 4:
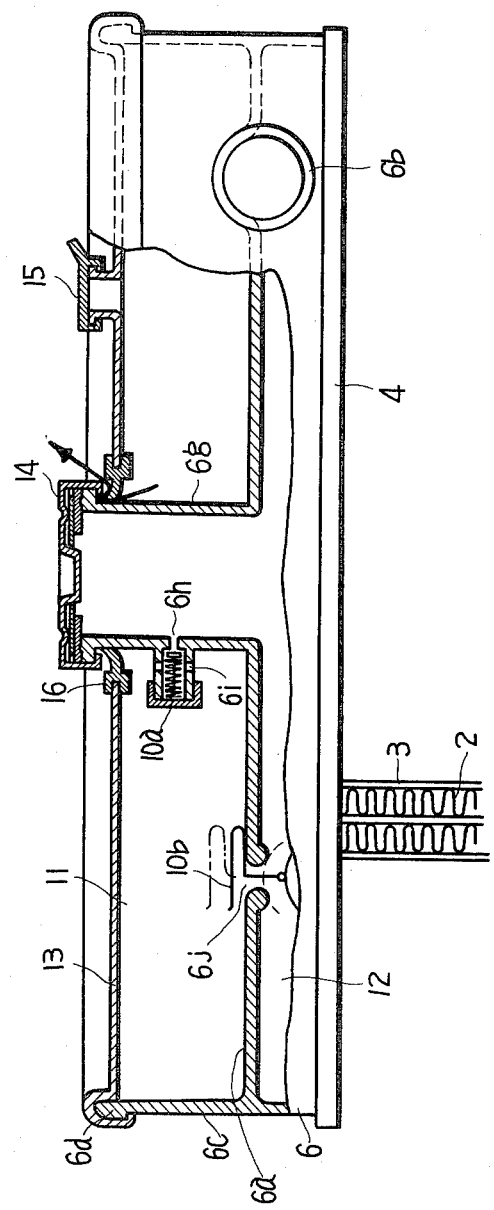
FIGS. 4, 5 and 6 are expanded fragmentary sectional views partially diagrammatic for illustrating modified embodiments according to the present invention.

FIG. 4 shows another embodiment of the present invention, in which the filler tube 6g is integrally formed with the partition wall 6a and is protruded from the cover plate 13. The pressure-relief cap 14 is engaged with the rim formed around the filler tube 6g.

The positive pressure valve 10a is provided on the filler tube 6g and is located in the upper room 11. The valve 10a includes apertures 6h and 6i to form a passageway from the lower room 12 to the upper room 11 therethrough.

The negative pressure valve 10b is provided on the partition wall 6a and includes an aperture 6j to form a passageway from the upper room 11 to the lower room 12.

A supply cap 15 is provided on the cover plate 13, so that the supply of the cooling fluid to the upper room 11 may be made therethrough. A grommet 16 made of rubber is provided on the cover plate 13 surrounding the filler tube 6g for communicating the upper room 11 with the atmosphere through a space between the grommet 16 and the filler tube 6g.

Figure 5:
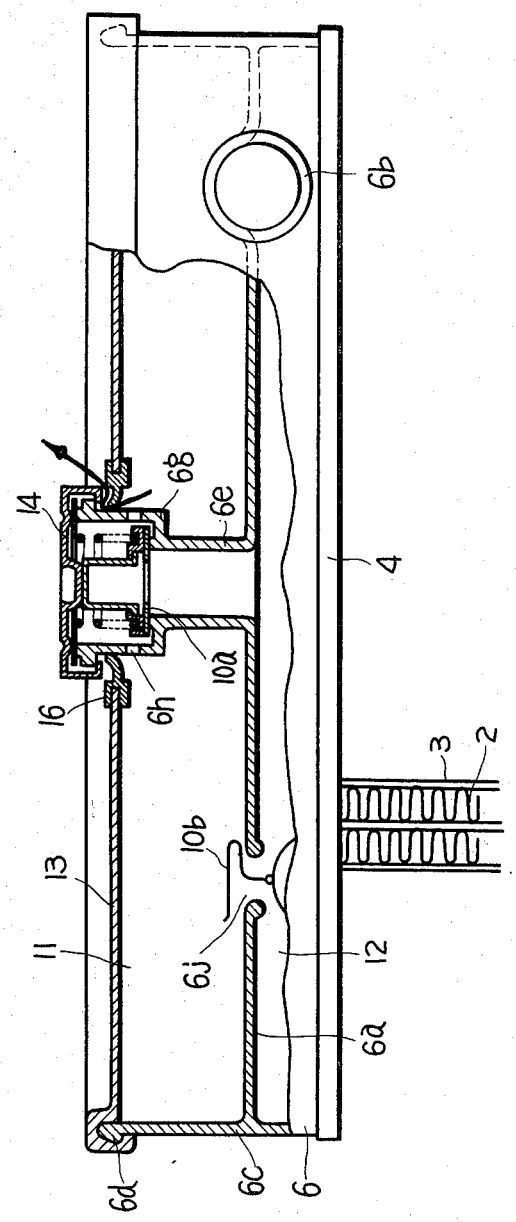

FIG. 5 shows a further embodiment of the present invention, in which differences compared with the embodiment shown in FIG. 4 reside in that the positive pressure valve 10a is mounted on the filler tube 6g, eliminating the supply cap 15.

The operation of these embodiments in FIGS. 4 and 5 is almost the same as that of the first embodiment, and therefore, is omitted.

Figure 6:
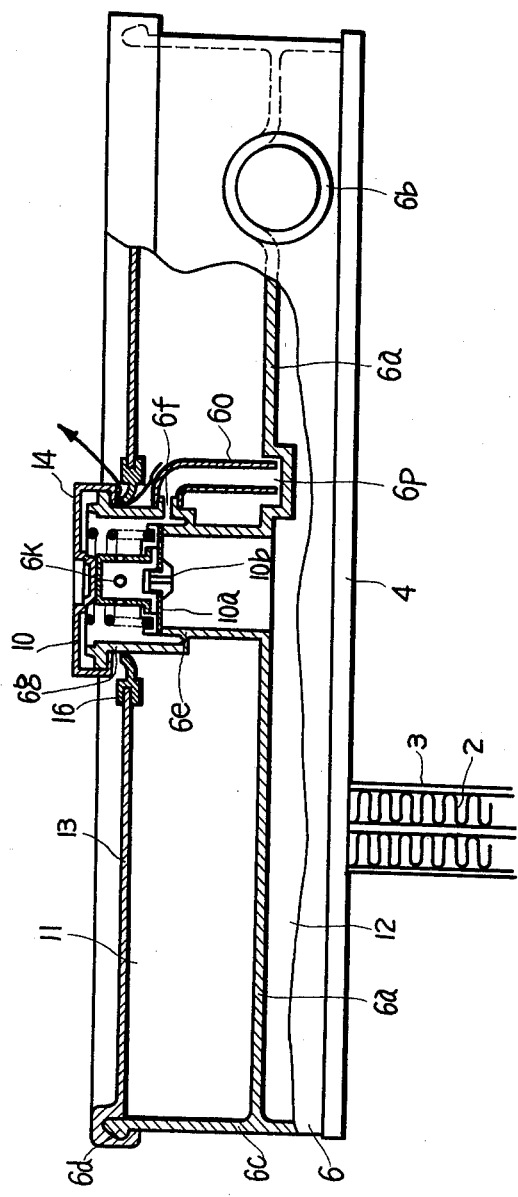

FIG. 6 shows furthermore another embodiment of the present invention, in which the filler tube 6g is integrally formed with the partition wall 6a and is protruded from the cover plate 13, and the pressure-relief cap 14 is engaged with the rim formed around the filler tube 6g as in FIG. 4 or 5.

The positive and negative pressure valve 10a and 10b are mounted in the filler tube 6g and the apertures 6k are provided on the cylindrical portion of the positive pressure valve 10a as in the same manner described in FIG. 3. An aperture 6f is provided on the filler tube, to which a hose 6o is fitted at one end.

The other end of the hose 6o is positioned close by a concave portion 6p integrally provided on the partition wall 6a.

Accordingly, when the pressure of the cooling fluid in the lower room 12 exceeds a predetermined value the fluid flows from the lower room 12 to the upper room 11 through the positive pressure valve 10a, the aperture 6f and the hose 6o.

When the pressure decreases below a predetermined value the fluid flows from the upper room 11, especially from the concave portion 6p, to the lower room 12 through the hose 6o, the aperture 6f, the apertures 6k on the cylindrical portion of the positive pressure valve 10a and the negative pressure valve 10b.

What we claim is:

1. A heat exchanger used in an automotive vehicle comprising:
    upper and lower tanks,
    a plurality of conduits extending between and in communication with said upper and lower tanks, and
    a plurality of radiating fins provided in spaces between said conduits; wherein said upper tank comprises:
    a partition wall, disposed in said upper tank, for dividing said upper tank into upper and lower rooms,
    means for maintaining the pressure in said upper room at the pressure of the atmosphere surrounding said heat exchanger,
    tubular means, connected to said lower room to communicate said lower room with said atmosphere, for supplying cooling fluid into said lower room therethrough,
    a cap removably mounted on the upper end of said tubular means,
    a negative pressure valve, positioned on said partition wall apart from said tubular means, for passing air contained in said supplied cooling fluid therethrough into said upper room as the level of said cooling fluid goes up in said lower room,
    means, provided in said tubular means, for passing said cooling fluid into said upper room from said tubular means to reserve said cooling fluid in said upper room; and
    a positive pressure valve removably installed in said tubular means, for opening itself to allow escape of said cooling fluid into said upper room through said cooling fluid passing means when the pressure in said lower room exceeds a first predetermined value,
    said negative pressure valve being operative to allow flow through itself of said reserved cooling fluid in said upper room into said lower room when the pressure in the lower room becomes lower than a second predetermined value.

2. A heat exchanger as in claim 1, wherein an upper wall of said upper room is detachable from a circumferential outer wall of said upper room.

3. A heat exchanger as in claim 1, wherein said upper tank is made of a resin.

4. A heat exchanger as in claim 3, wherein an upper wall of said upper room is detachably connected with a circumferential outer wall of said upper room.

5. A heat exchanger as in claim 1, wherein said cooling fluid passing means is positioned between said positive pressure valve and an upper wall of said upper room.

6. A heat exchanger as set forth in claim 1, wherein said partition wall is made of a resin.

* * * * *